3,171,824
PROCESS OF CURING HYDROCARBON COPOLYMERS WITH DICUMYL PEROXIDE

Charles A. Young, Christiana Hundred, Del., assignor to E. I. du Pont de Nemours and Company, Wilmington, Del., a corporation of Delaware
No Drawing. Filed May 12, 1960, Ser. No. 28,519
2 Claims. (Cl. 260—27)

This invention relates to an improved process for curing hydrocarbon copolymers.

Hydrocarbon copolymers of alpha monoolefins are valuable elastomer candidates for the trade. Unfortunately, they are not as convenient to cure as natural rubber or SBR rubber. Unlike the latter, they are substantially free of sulfur curable ethylenic unsaturation.

It has been found that these copolymers can be cured by heating them with dicumyl peroxide. However, the vulcanizates obtained have an objectionable odor which results from the decomposition products generated by the dicumyl peroxide during the curing process. This odor could adversely affect future customer acceptance of these elastomers.

It is an object of the present invention to provide an improved process for curing hydrocarbon copolymers. A further object is to provide an improved process for curing hydrocarbon copolymers with dicumyl peroxide. A still further object is to provide a process for masking the objectionable odor arising when hydrocarbon copolymers of ethylene and alpha monoolefins are cured with dicumyl peroxide. Other objects will appear hereinafter.

These and other objects are accomplished by a process for curing a substantially saturated hydrocarbon copolymer which comprises incorporating therewith, per 100 parts by weight of said copolymer, from about 1.0 to 10 parts by weight of dicumyl peroxide followed by heating at temperatures of from about 130 to 210° C., with the proviso that about 0.5 to 1.5 parts by weight of pine oil or pine tar, for every part by weight of said dicumyl peroxide, be incorporated with said copolymer prior to the heating step.

To carry out the present process it is merely necessary to incorporate the dicumyl peroxide and the pine oil or pine tar into the hydrocarbon copolymer stock and thereafter apply heat until a cure is effected. The order of addition is not critical. This process not only provides improved gum vulcanizates, but it is particularly valuable for curing black loaded stocks.

The hydrocarbon copolymers which may be cured according to the present invention are the substantially saturated copolymers of ethylene and at least one alpha olefin of the formula $CH_2=CHR$ where R is an alkyl radical of not more than eight carbon atoms. In order that these copolymers exhibit desirable elastomeric properties they should contain from about 20 to 75 per cent ethylene units by weight.

Representative examples of these hydrocarbon copolymers are: ethylene/propylene, which is preferred; ethylene/1-butene; ethylene/propylene/1-hexene; and ethylene/1-decene. In general, these copolymers are linear, high molecular weight, substantially saturated, normally solid hydrocarbons. Usually they are largely amorphous. Their inherent viscosities (0.1 percent by weight concentration in tetrachloroethylene at 30° C.) usually have values of at least 0.65.

These copolymers may be prepared by the use of catalysts generally known as coordination catalysts. These are made from components of two types, first, compounds of the transition heavy metals of Groups IV, V and VI beginning with titanium, vanadium and chromium, and, second, organo-metallic compounds, hydrides and free metals of Groups I, II and III. The compounds of the first type are preferably halides, oxyhalides and alcoholates, the preferred metals being titanium and vanadium. The metals of the component of the second type are preferably lithium, sodium, magnesium and aluminum and the organic portions are preferably alkyl radicals. In these organometallic compounds the valences of the metal may be partly satisfied by halogen or alkoxyl, provided, of course, that at least one bond connects the metal with an organic radical. Mixtures of two or more compounds of the type described above may often be used to advantage.

As is well known, these catalysts must be used in strict absence of oxygen, water or other material with which they react, and for this reason the solvents in which they are used are greatly limited, the preferred ones being the saturated aliphatic and hydroaromatic hydrocarbons and certain non-reactive halogen compounds such as tetrachloroethylene and chlorobenzenes. These solvents conveniently serve as solvents for the polymerization of the olefins, which, for example, is usually carried out in a dilute suspension of the catalyst. The polymerization normally will be carried out at ordinary temperatures and pressures, although it is usually convenient to allow the temperature to rise spontaneously to 50° to 60° C. due to the heat of the reaction. The rate of the reaction may be increased by the use of increased pressures, for instance, up to 1000 atmospheres or above, or by increased temperatures up to 150° C., although it is to be understood that elevated temperatures and pressures are not required. Where found desirable, the polymerization may be carried out at lower temperatures and pressures.

The above copolymers and processes for their preparation are more particularly described in the following references: Natta et al., *Chimicae industria* 39, 733, 743, 825 (1957); ibid., 41, 764 (1959); Australian application 9,651/55; Belgian Patent 553,655; Australian application 24,034/56; U.S. 2,824,090; U.S. 2,820,778; Australian application 18,647/56; Australian application 17,773/56; Australian application 44,016/58.

In general, about 1.0 to 10 parts by weight of dicumyl peroxide is used for every 100 parts by weight of the hydrocarbon copolymer. The preferred concentration ranges between about 2 parts and about 5 parts. Lower moduli and tensile strengths are displayed by vulcanizates as the proportion of dicumyl peroxide is decreased, other conditions being held constant. When less than about 1.0 part of dicumyl peroxide is employed, the vulcanizates tend to be undercured. It is generally both unnecessary and uneconomical to introduce more than 10 parts.

In general, about 0.5 part to 1.5 parts of pine oil or pine tar is employed for every part by weight of dicumyl peroxide. The masking effect is less satisfactory when less than about 0.5 part is added. It is usually unnecessary to supply more than about 1.5 parts.

By "pine oil" is meant the oil obtained by extraction and fractionation or by steam distillation or by destructive distillation of the wood of *Pinus palustris* Miller and other species of Pinus. This oil has a specific gravity (15.5°/15.5° C.) ranging between about 0.930 and 0.945. At least 90 percent of the distillate by volume boils below 225° C. and no more than about 5 and 30 percent by volume boils below 185° C. and 200° C., respectively, at atmospheric pressure. The minimum terpene alcohol content is 65 percent by weight and the acid number is preferably nil but may be as high as 60. Pine oil meeting Federal Specifications LLL–O–358 (July 13, 1945) is representative of the grades suitable for use in the present invention. Descriptions of the sources of this material and processes for its isolation are contained in: Wood Distillation, L. F. Hawley, Chemical Catalogue Company, Inc., New York, 1923, pp. 91–94, 106; The Chemistry of Wood, L. F. Hawley and L. E. Wise, Chemical Catalogue Company, Inc., New York, 1926, p. 109; Standards of Pine Oil for Medicinal Use, H. Wiese, U. of Wisconsin Pharmaceutical Experimental Station Circular 10, February 1921; The Essential Oils, E. Guenther, vol. VI, D. Van Nostrand Co., Inc., New York, pp. 297–298; Chemical Processing of Wood, A. J. Stamm and E. E. Harris, Chemical Publishing Co., New York, 1953, pp. 458 and 472.

By "pine tar" is meant the empyreumatic syrup-like mass obtained by the destructive distillation of the wood of the Pinus species. At least 98 percent (by volume) boils above 158° C. and at least 70 percent (by volume) boils below 365° C. Typical distillation data of representative pine tars are as follows:

| Percent (by volume distilled): | T (° C.) |
|---|---|
| 0 (initial drop) | 150–204 |
| 10 | 158–247 |
| 30 | 243–315 |
| 50 | 318–348 |
| 80 | 340–355 |

Its flash point (open cup) ranges between about 82° C. and 130° C. Its acid number does not exceed about 60. Pine tar meeting Federal Specification JJJ–T–121 (April 1, 1942) is representative of the grades suitable for use in the present invention. Its viscosity at 30° C. (determined as directed in the Federal Specification) ranges between about 1400 and 2300 centipoises. Pine tar is further described in the following references: The Pharmacopoeia of the United States of America, 13th Revision, Mack Printing Co., Easton, Pa., 1947, p. 554; The Chemistry of Wood, p. 693; The Essential Oils, pp. 303–310; Chemical Processing of Wood, pp. 457–461.

For the compounding operation, conventional mixing equipment such as rubber roll mills and Banbury mixers can be employed. Selection of the temperature is within the skill of the art. Each copolymer will exhibit its own processing characteristics.

Once the stock has been compounded with dicumyl peroxide and the pine oil or pine tar, it can be stored for at least a week at 30° C. It is usually desirable to incorporate an antioxidant to protect the copolymer from air oxidation. When resistance to sunlight is important, addition of an ultraviolet light absorber is advantageous.

Once compounded, the stock may be cured by heating it at about 130° C. to about 210° C. for times ranging from about 5 minutes to an hour or more. Determination of the proper time at a particular temperature is within the skill of the art. In general, higher temperatures require shorter cure times and vice versa. The preferred temperature range is about 150 to 170° C.

The copolymers cured by this invention have many varied uses. They may be employed in the preparation of tires, inner tubes, belts, hose and tubing, wire and cable jackets, footwear, sponges, coated fabrics, and a wide variety of coated or molded articles. They are characterized by good thermal stability and excellent resistance to ozone. The uncured but compounded copolymers are not affected by moisture and can be stored for lengthy periods before shaping and vulcanizing.

The following example will better illustrate the nature of the present invention; however, the invention is not intended to be limited to this example. Parts are by weight unless otherwise indicated.

Example 1

A. The rubbery ethylene/propylene copolymer employed contained about 58 weight percent propylene monomer units. It exhibited a Mooney viscosity (ML–4 at 100° C.) of 32 and an inherent viscosity (0.1 percent by weight solution in tetrachloroethylene at 30° C.) of 2.3. This copolymer was prepared in a 1.5-liter glass reactor liquid-full with tetrachloroethylene at 41° C. A gas feed stream continually supplied ethylene and propylene at the respective rates of 0.5 lb./hr. and 1.26 lb./hr. A 0.00041 molar tetrachloroethylene solution of aluminum triisobutyl and a 0.00057 molar tetrachloroethylene solution of vanadium oxytrichloride were continually introduced in separate streams into the reactor at the respective rates of 0.9 liter/hr. and 2.5 liters/hr. In the reactor the Al:V molar ratio had a value of 2.6. The residence time was 26.5 minutes.

100 parts by weight of the copolymer was compounded on a rubber roll mill with 0.2 part of 4,4'-thiobis(2-tert-butyl-5-methylphenol), 50 parts of super abrasion furnace black, 10 parts of a mixture containing 40 percent by weight dicumyl peroxide and 60 percent by weight high abrasion furnace black, 1.2 parts of a mixture containing 33 percent by weight of N,4-dinitroso-N-methylaniline and 67 percent by weight clay and 3 parts of pine tar. The stock obtained was cured in a mold for one hour at 153° C. The vulcanizate obtained had a pleasant pine tar odor.

The pine tar used displayed the following boiling point behavior at atmospheric pressure. First drop came over at 150° C.; 10 percent by volume had distilled at 158° C.; 20 percent by volume had distilled at 158° C.; 30 percent by volume had distilled at 243° C.; 40 percent by volume had distilled at 305° C.; 50 percent by volume had distilled at 318° C.; 60 percent by volume had distilled at 328° C.; 70 percent by volume had distilled at 338° C.; 80 percent by volume had distilled at 340° C.

B. The procedure of Part A above was repeated except that the pine tar was omitted and the amount of the peroxide mixture was reduced to 7.5 parts. The vulcanizate obtained displayed a strong, disagreeable odor suggestive of acetophenone.

C. The procedure of Part A was repeated except that only 1 part of pine tar was employed. Unlike the vulcanizate obtained in Part B above, the disagreeable odor was only partially masked by the pine tar.

D. Substitution of pine oil having a density at 25° C. of 0.93 gram/cc. for pine tar in the procedure of Part C above gave similar results.

As many widely different embodiments of this invention may be made without departing from the spirit and scope thereof, it is to be understood that this invention is not limited to the specific embodiments thereof except as defined in the appended claims.

What is claimed is:

1. In the process of curing a copolymer having from about 20 to 75 percent by weight ethylene monomer units with the remainder being monomer units of at least one alpha monoolefin having the structure $CH_2=CHR$ wherein R is an alkyl radical of not more than eight carbon atoms, which consists essentially of incorporating therewith from about 1.0 to 10 parts by weight of dicumyl peroxide per 100 parts by weight of said copolymer and heating at 130 to 210° C. so as to effect a cure, the improvement comprising incorporating with said copolymer prior to the heating step from about 0.5 to 1.5 parts by weight, for every part by weight of said dicumyl peroxide, of a composition selected from the group consisting of pine oil and pine tar.

2. A process according to claim 1 wherein the copolymer is an ethylene-propylene copolymer.

References Cited by the Examiner

UNITED STATES PATENTS

| | | | |
|---|---|---|---|
| 2,129,478 | 9/38 | Rohm | 260—27 |
| 2,728,752 | 12/55 | Brown | 260—88.2 |
| 2,824,090 | 2/58 | Edwards et al. | 260—88.2 |
| 2,888,424 | 5/59 | Precopis et al. | 260—41 |
| 2,911,391 | 11/59 | Vandenberg | 260—88.2 |
| 2,983,714 | 5/61 | Robinson et al. | |

FOREIGN PATENTS 559,700    7/58    Canada.

OTHER REFERENCES

Rose et al.: The Condensed Chemical Dictionary, Fifth Edition, 1956, page 869.

WILLIAM H. SHORT, *Primary Examiner.*

A. D. SULLIVAN, MILTON STERMAN, JAMES A. SEIDLECK, *Examiners.*